Jan. 12, 1943.  G. DONASON  2,307,826
SICKLE CARRIER
Filed March 25, 1941  3 Sheets-Sheet 3
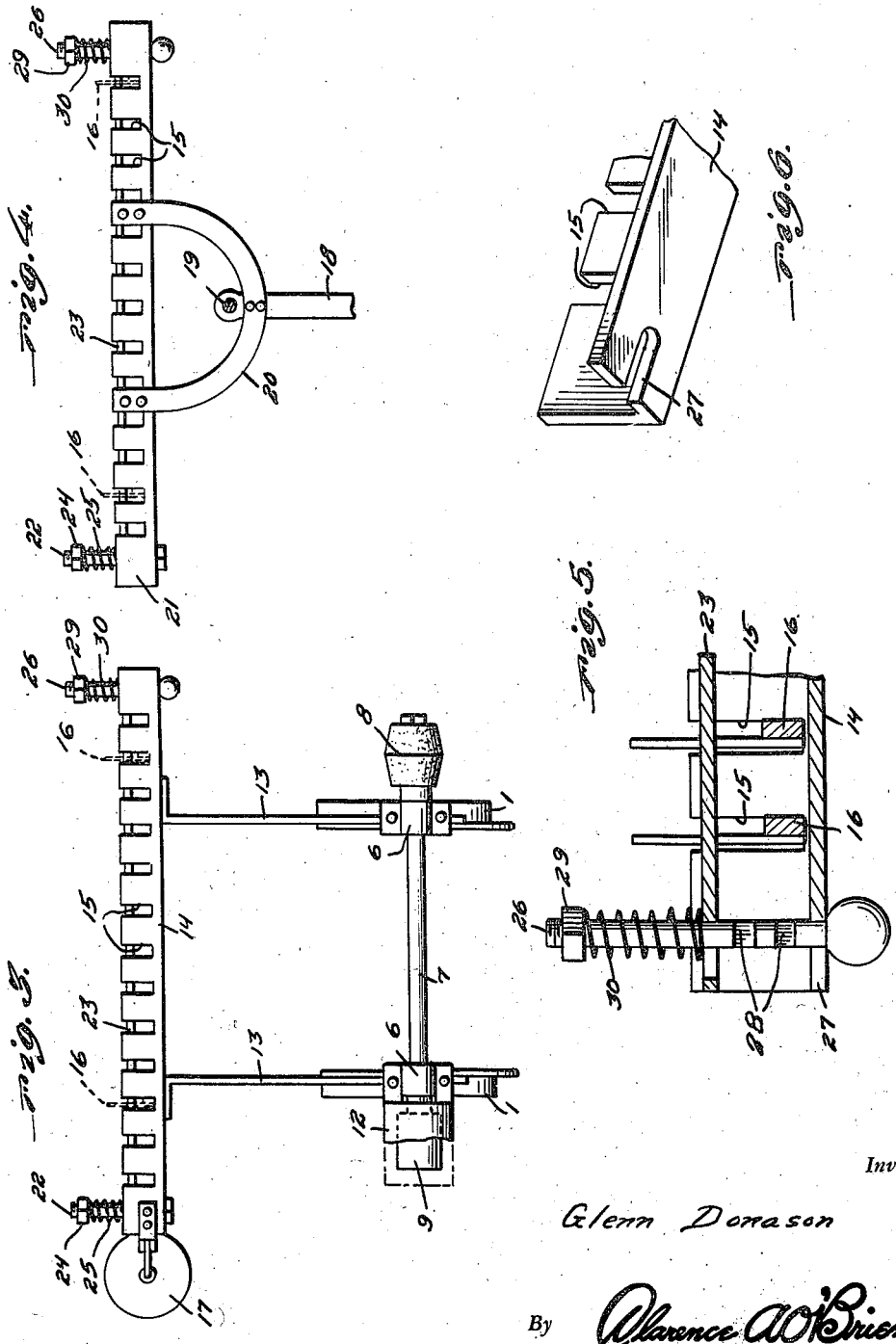
Inventor
Glenn Donason
By Clarence A. O'Brien
Attorney Patented Jan. 12, 1943

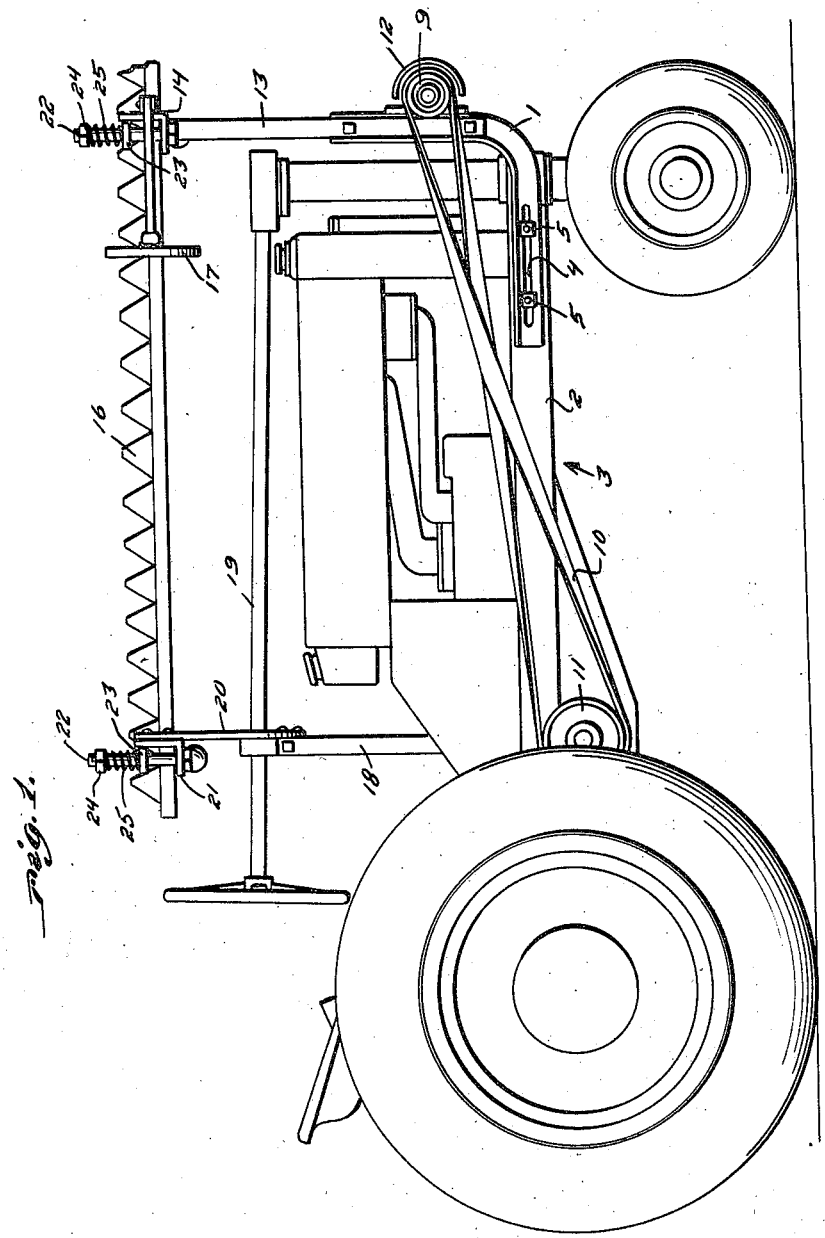

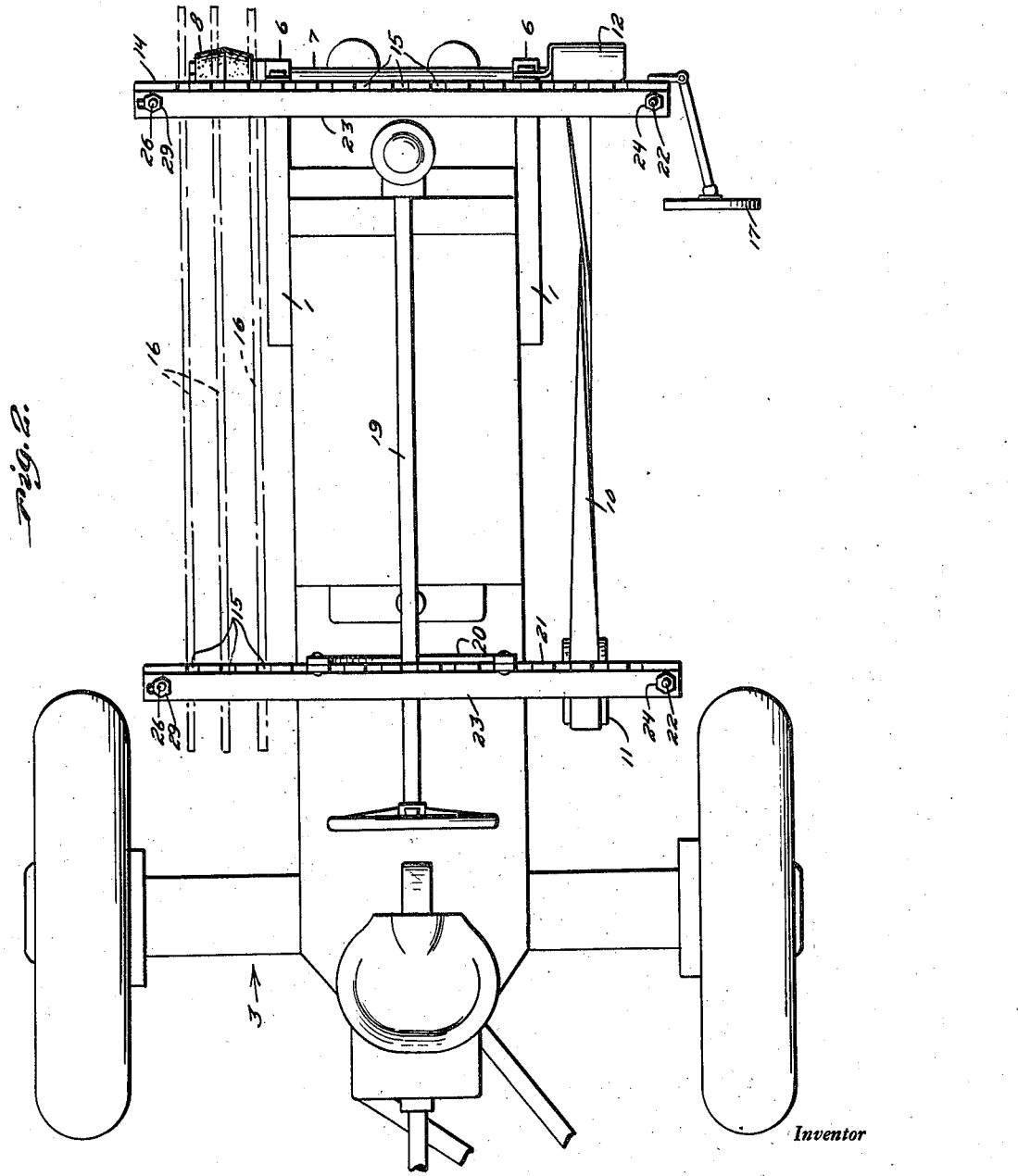

2,307,826

UNITED STATES PATENT OFFICE 2,307,826

SICKLE CARRIER

Glenn Donason, Mills, Nebr.

Application March 25, 1941, Serial No. 385,157

1 Claim. (Cl. 211—60)

The present invention relates to new and useful improvements in sickle carriers and has for its primary object to provide, in a manner as hereinafter set forth, an apparatus of this character which is adapted to be expeditiously mounted on a conventional tractor without the necessity of making material structural alterations therein.

Another very important object of the invention is to provide means whereby a plurality of sickles may be conveniently carried on a tractor to be conveniently used as needed, the invention further comprising means whereby the sickles may be ground or sharpened in the field, said grinding means being operable from the usual power take-off of the tractor.

Other objects of the invention are to provide a sickle carrier and grinder of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing an apparatus constructed in accordance with the present invention mounted on a tractor.

Figure 2 is a top plan view thereof.

Figure 3 is a view in front elevation of the apparatus.

Figure 4 is a view in front elevation of the rear rack, the steering shaft of the tractor being shown in cross section.

Figure 5 is a view in vertical longitudinal section through an end portion of one of the racks and the sickle retaining means.

Figure 6 is a perspective view of an end portion of one of the racks.

Referring now to the drawings in detail, it will be seen that the embodiment of the invention which has been illustrated comprises a pair of angular brackets 1 of angle iron which are mounted on the sides of the frame 2 of a tractor which is designated generally at 3. The angular arms 1 project forwardly and then upwardly from the tractor frame 2. The rearwardly extending lower portions of the arms 1 have formed therein longitudinal slots 4 which accommodate bolts 5 for adjustably securing said arms to the tractor frame 2.

Mounted on the upstanding portions of the arms 1 are suitable bearings 6. Journaled in the bearings 6 is a transverse shaft 7. Mounted on one end portion of the shaft 7 is a grinding wheel 8. Mounted on the other end portion of the shaft 7 is a pulley 9. An endless drive belt 10 operatively connects the pulley 9 to the usual power take-off 11 of the tractor 3 for actuation thereby. Projecting laterally from the arm 1 which is adjacent the pulley 9 is a guard 12 for the drive belt 10.

Mounted on the vertical portions of the arms 1 is a pair of uprights 13. Mounted horizontally on the upper ends of the uprights 13 is a transversely extending front rack 14 of angle iron. The rack 14 includes a vertical flange having formed therein spaced notches or recesses 15 for the reception of one or more sickles 16. A rear view mirror 17 is mounted on one end portion of the front rack 14.

Mounted on the post 18 which supports the steering shaft 19 of the tractor 3 is a substantially U-shaped bracket 20. Mounted horizontally on the bracket 20 is a rear rack 21 which is similar to and longitudinally aligned with the front rack 14. Of course, the notches or recesses in the rear rack 21 are for the reception of the sickles 16.

Fixed on one end portion of the racks 14 and 21 and rising therefrom are threaded rods or bolts 22. The reference numeral 23 designates sickle retaining or clamping bars having one end portion loosely connected to the bolts 22 for swinging and sliding movement. Nuts 24 are threaded on the bolts 22 and mounted below said nuts are coil springs 25 for yieldingly urging the bars 23 downwardly.

Loosely mounted in the free or other end portions of the bears 23 are bolts 26. The racks 14 and 21 are provided, in one end portion, with open slots or recesses 27 for the reception of the headed lower end portions of the bolts 26. These lower end portions of the bolts 26 have formed therein notches or grooves 28 for adjustably anchoring said bolts in the racks 14 and 21. The bolts 28 are provided with nuts and coil springs 29 and 30, respectively, which function in a manner similar to the elements 24 and 25.

It is thought that the manner in which the invention functions will be readily apparent from a consideration of the foregoing. Briefly, the sickles to be carried are mounted in spaced, parallel relation on the front and rear racks 14 and 21, respectively, the end portions of said sickles being engaged in the notches or recesses 15. As shown to advantage in Figure 1 of the drawings, the sickles are mounted on the racks 14 and 21 with the blades of said sickles projecting upwardly. Bars 23 are then swung on the bolts 22 to positions over the racks 14 and 21 and engaged between the blades of the sickles. Of course, the bars 23 extend transversely across the end portions of the sickles. The bolts 26 are then forced downwardly to properly tension the coil springs 30 and said bolts are engaged in the slots 27 of the racks 14 and 21. Thus, the bars 23 are caused to securely clamp the sickles in the notches or recesses 15 of the racks 14 and 21. Upward movement of the clamping bars 23 is yieldingly resisted by the coil springs 25 and 30. The notches or grooves 28 in the bolts 26 permit the springs 30 to be placed under any desired tension. Of course, when it is desired to remove one of the sickles from the racks 14 and 21, the bolts 26 are swung out of the slots 27 thereby freeing one end of the clamping bars 23. These bars are then raised and swung around to an out-of-the-way position on the bolts 22, thus permitting the desired sickle to be lifted out of the notches or recesses 15 in which it is resting. The grinding wheel 8 may be driven at any time from the power take-off of the tractor, thus permitting the sickles to be conveniently ground or sharpened in the field. By moving the arms 1 forwardly on the tractor frame 2 the drive belt 10 may be tightened or adjusted as desired.

It is believed that the many advantages of a sickle carrier and grinder constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

A sickle carrier comprising a pair of racks mounted transversely above a tractor, said racks including angle irons having vertically extending flanges provided with spaced notches for the reception of a plurality of sickles, clamping bars for the sickles having one end pivotally and slidably connected to the racks, said racks having slots in one end portion, bolts slidably mounted in the free end portions of the clamping bars and engageable in the slots for detachably connecting said free end portions of said clamping bars to said racks, and coil springs on the bolts for yieldingly urging the clamping bars downwardly into engagement with the sickles.

GLENN DONASON.